US007610141B2

(12) United States Patent
Toyohara et al.

(10) Patent No.: US 7,610,141 B2
(45) **Date of Patent: *Oct. 27, 2009**

(54) CONTROL APPARATUS FOR DIRECT INJECTION TYPE INTERNAL COMBUSTION ENGINE

(75) Inventors: Masahiro Toyohara, Hitachiota (JP); Takashi Okamoto, Hitachinaka (JP); Michihiko Hasegawa, Hitachinaka (JP)

(73) Assignee: Hitachi, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/164,555

(22) Filed: Jun. 30, 2008

(65) Prior Publication Data

US 2008/0270007 A1 Oct. 30, 2008

Related U.S. Application Data

(63) Continuation of application No. 11/834,951, filed on Aug. 7, 2007, now Pat. No. 7,418,337.

(30) Foreign Application Priority Data

Aug. 10, 2006 (JP) ............................ 2006-217652

(51) Int. Cl.
*F02D 41/04* (2006.01)
*G06F 19/00* (2006.01)

(52) U.S. Cl. ...................................... 701/104; 123/446

(58) Field of Classification Search ......... 701/103–105; 123/478, 480, 446, 520
See application file for complete search history.

(56) References Cited

U.S. PATENT DOCUMENTS

| | | | | |
|---|---|---|---|---|
| 4,879,673 | A | 11/1989 | Nagase et al. | |
| 6,705,296 | B2 | 3/2004 | Horstmann et al. | |
| 6,725,842 | B2 * | 4/2004 | Matsumoto ................. | 123/480 |
| 7,418,337 | B2 * | 8/2008 | Toyohara et al. ............ | 701/104 |

FOREIGN PATENT DOCUMENTS

| | | |
|---|---|---|
| JP | 58-217759 | 12/1983 |
| JP | 2003-074397 | 3/2003 |
| JP | 2004-346852 | 12/2004 |
| JP | 2006-057514 | 3/2006 |

* cited by examiner

*Primary Examiner*—Hieu T Vo
(74) *Attorney, Agent, or Firm*—Crowell & Moring LLP

(57) ABSTRACT

An apparatus controls the quantity of fuel injection of an injector in accordance with the fuel pressure in the fuel rail of a direct injection type internal combustion engine. A reference value for controlling the injector is obtained on the basis of the difference and the fuel pressure in the fuel rail at the time of starting fuel injection out of injector.

5 Claims, 12 Drawing Sheets

CONTROL APPARATUS FOR DIRECT INJECTION TYPE INTERNAL COMBUSTION ENGINE

CROSS REFERENCE TO RELATED APPLICATION

This application is a continuing application of U.S. application Ser. No. 11/834,951, filed Aug. 7, 2007, now U.S. Pat. No. 7,418,337 B2, issued 26 Aug. 2008, which claims priority under 35 U.S.C. § 119 to Japanese Patent Application No. 2006-217652, filed Aug. 10, 2006, the entire disclosure of which are herein expressly incorporated by reference

BACKGROUND OF THE INVENTION

This invention relates to a control apparatus for a direct injection type internal combustion engine.

An accumulator type fuel injection control apparatus is well known as an apparatus for feeding fuel into the plural cylinders of a direct injection type internal combustion engine. According to this type of fuel injection control apparatus, fuel is pressurized in the fuel rail (common rail) by the use of a fuel pump and then is injected into the cylinders through the injectors mounted on the fuel rail. Further, this fuel injection control apparatus makes it possible to obtain such an optimal fuel injection quantity as to stabilize fuel combustion by making the pressure of fuel in the rail variable.

With the accumulator type fuel injection control apparatus as described above, the pressure of the fuel in the fuel rail (hereafter also referred to simply as "fuel pressure") pulsates due to the feed (hereafter referred to also as "discharge") of fuel from the fuel pump to the fuel rail and the injection of fuel through the injectors. This change in the fuel pressure directly affects the amount of injected fuel. Consequently, precision in the control of the air-fuel ratio deteriorates with the result that the exhaust emission is adversely affected.

A method wherein a desired fuel injection quantity can be secured by measuring the fuel pressure in the fuel rail and controlling the injection of fuel in accordance with the measured pressure, is disclosed in, for example, Japanese patent documents JP-A-2004-346852 and JP-A-2006-57514.

SUMMARY OF THE INVENTION

In each of the Japanese patent documents JP-A-2004-346852 and JP-A-2006-57514, it is described that the fuel pressure is measured during a predetermined period and this result of measurement is reflected in the following control of fuel injection.

In the case where the previous measurement of the change in the fuel pressure is reflected in the following control of the fuel injection, however, control precision cannot be attained and error in the control of fuel injection may be caused, if change occurs in the injection pulse width, the fuel injection timing of the injectors or the start timing of discharging fuel by the fuel pump.

This invention, which has been made to overcome the above described drawbacks of the conventional system, aims to provide a fuel injection control apparatus for an internal combustion engine, in which the error in the fuel injection control is very small.

The object of this invention can be attained by providing a control apparatus for an internal combustion engine having a high-pressure fuel pump and fuel injectors, wherein the control apparatus comprises a fuel quantity calculating means for calculating the quantity of injected fuel from each of the injectors, a means for calculating the quantity of fuel discharged from the high-pressure fuel pump into the fuel rail, and a means for calculating the difference between the quantity of fuel injected out of the injector calculated by the fuel injection quantity calculating section and the quantity of fuel discharged from the high-pressure fuel pump into the fuel rail calculated by the fuel discharge quantity calculating unit the quantity of the injected fuel obtained by the means for calculating the quantity of discharged fuel and the actual quantity of discharged fuel, wherein the reference value for controlling the injectors is obtained on the basis of the fuel pressure at the injection timing and the difference, and the injectors are controlled on the basis of the reference value.

Through the above described control, an internal combustion engine can be provided which, without resort to additional actuators and sensors, realizes accurate fuel injection control irrespective of the change in the fuel pressure in the fuel rail fluctuating due to the fuel discharge from the high-pressure fuel pump and the fuel injection from the injectors. Accordingly, high precision air-fuel ratio control can be achieved for the internal combustion engine and therefore improved drivability can be achieved and harmful chemical substances in the exhaust gas can be reduced.

Other objects, features and advantages of the invention will become apparent from the following description of the embodiments of the invention taken in conjunction with the accompanying drawings.

DESCRIPTION OF THE EMBODIMENTS

This invention will now be described in detail by way of an embodiment with reference to the attached drawings.

Figure 1:
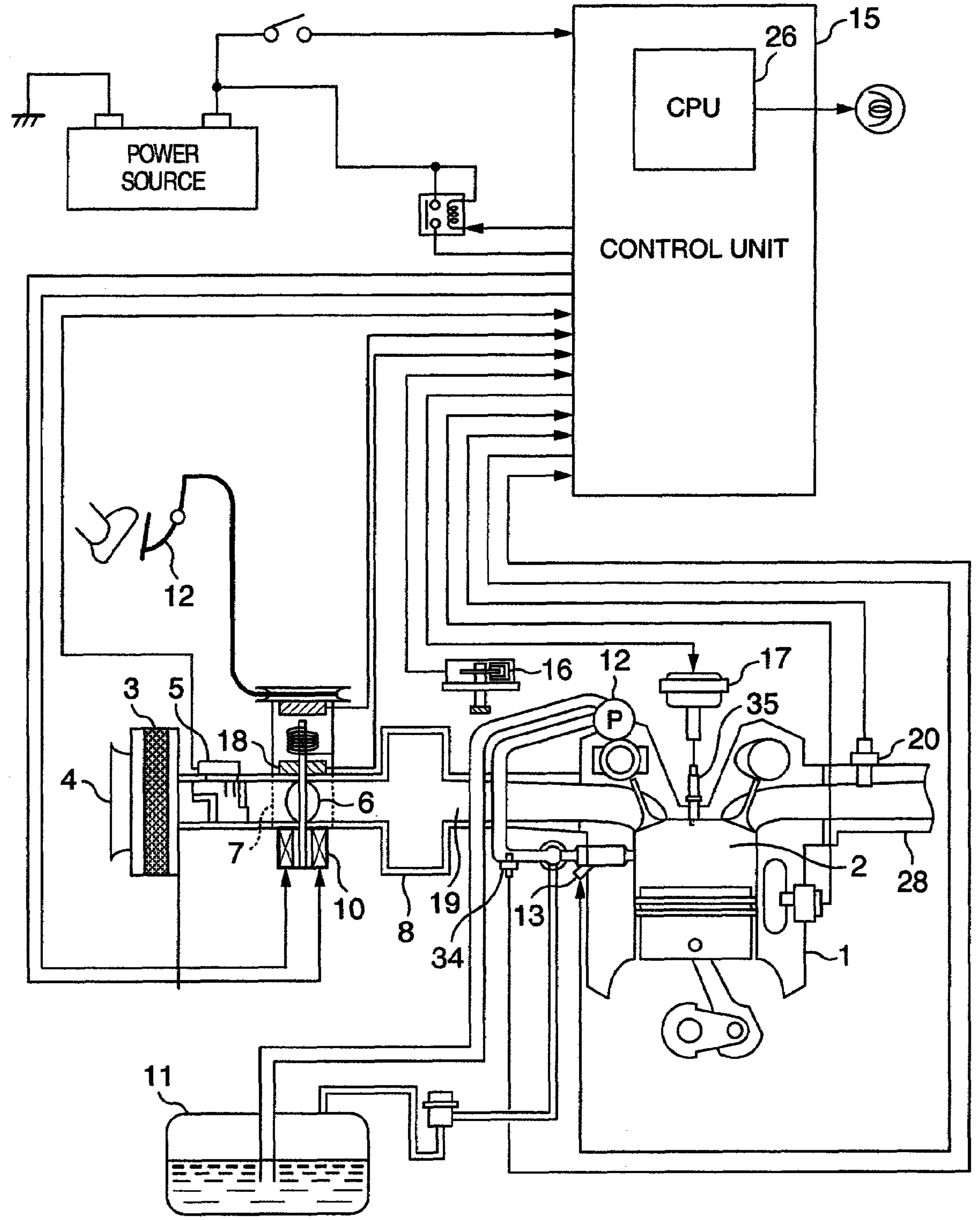
FIG. 1 shows a control apparatus for a direct injection type internal combustion engine according to this invention.

FIG. 1 shows a control system for a direct injection type internal combustion engine (hereafter referred to also as "engine") according to this invention. In FIG. 1, air to be drawn into an engine 1 first enters the inlet 3 of an air cleaner 4, and passes through an air flow sensor 5 and a throttle body 7 having therein a throttle valve 6 for controlling the intake air flow, into a collector 8. The throttle valve 6 is mechanically connected with a driving motor 10. The operation of the motor 10 actuates the throttle valve 6 to control the intake air flow.

The intake air in the collector 8 is then distributed to air inlet pipes 19 communicating with the cylinders 2 of the engine 1, and then fed into the cylinder 2 serving as a combustion chamber.

Fuel such as gasoline is sucked up from a fuel tank 11 and pressurized, by means of a fuel pump 12. The pressurized fuel is then fed into the fuel line which is connected with injectors 13 and the high-pressure fuel pump 12 for controlling the fuel pressure within a predetermined range. The fuel pressure is measured by a fuel pressure sensor 34. The fuel is injected into the combustion chambers by the injectors whose injection nozzles open in the cylinders 2 serving as the combustion chambers. The inhaled air and the injected fuel are mixed up together and the mixture is combusted as a result of ignition with sparks generated by ignition plugs due to a high voltage developed across an ignition coil 17 or a piezoelectric element.

The exhaust gas formed as a result of the combustion of the air-fuel mixture in the combustion chambers of the engine 1 is conducted to an exhaust pipe 28 and then released through a catalytic converter into the ambient air.

The air flow sensor 5 generates a signal indicating the intake air flow rate and the signal is fed to a control unit 15. The throttle body 7 is furnished with a throttle sensor 18 for sensing the aperture of the throttle valve 6 and the output of the throttle sensor 18 is also fed to the control unit 15.

A crank angle sensor 16 is actuated by the rotation of the cam shaft (not shown) of the engine 1 and detects the angular position of the crank shaft with a precision of at least 1~10°. The signal generated by the crank angle sensor 16 is also fed to the control unit 15.

The fuel injection timing, the quantity of injected fuel (corresponding to the injector pulse width), the fuel discharge timing of the high-pressure fuel pump and the ignition timing are controlled depending on these signals mentioned above.

An A/F sensor 20 set in the exhaust pipe 28 detects the operating air-fuel ratio based on the components of the exhaust gas. The signal output of the A/F sensor 20 is fed to the control unit 15, too.

Figure 2:
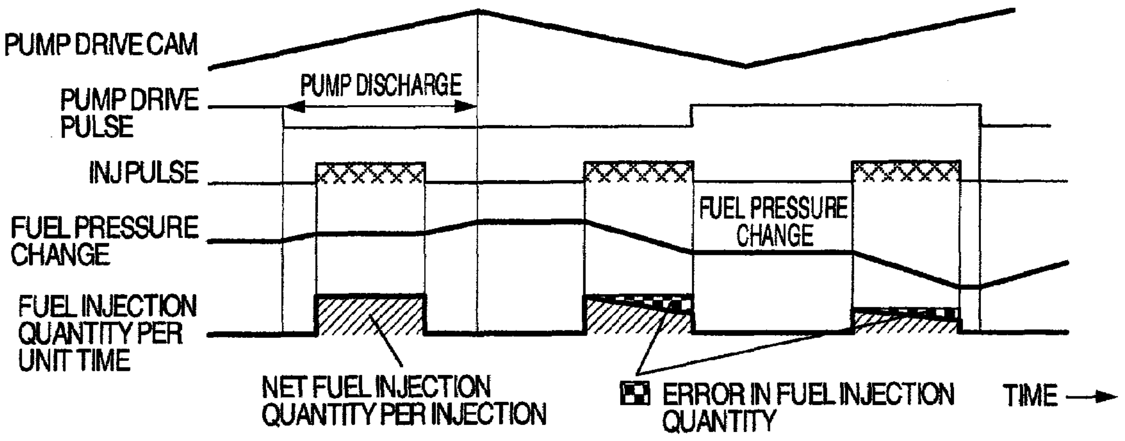
FIG. 2 graphically shows the variables changing with time, essential for the fuel injection control according to this invention.

FIG. 2 graphically shows the variables changing with time, essential for the accumulator injection control according to this invention.

In FIG. 2, the uppermost line chart represented as a chevron waveform reflects the profile of the cam to reciprocally drive the high-pressure fuel pump. The cam, with its nose (top dead center) and base (bottom dead center) corresponding respectively to the peak and trough in the line chart, drives the piston of the high-pressure fuel pump up and down. Just below the chevron waveform is the first rectangular pulse train form which represents the pulse signal to drive the solenoid that controls the quantity of fuel discharged from the high-pressure fuel pump. The high-pressure fuel pump forces fuel to the fuel rail from the moment that the solenoid drive pulse signal falls down to the low level (turns off) in FIG. 2 to the moment that the top dead center (TDC) of the cam (peak in FIG. 2) is reached. In this invention, important is the time that the high-pressure fuel pump starts discharging fuel to the fuel rail. In the above described case, the time for starting the feed of fuel from the high-pressure fuel pump to the fuel rail is set to be the moment that the solenoid drive pulse signal turns off. The time, however, may be synchronized with the moment that the solenoid drive pulse signal turns on (rises up to high level). Either time may be adopted in this invention.

As shown with the INJ pulse and the fuel pressure change in FIG. 2, it is noted that the fuel pressure in the fuel rail, while the injector is being actuated, differs depending on whether the high-pressure fuel pump is or is not discharging fuel to the fuel rail. This situation will be described with reference to FIG. 4.

Thus, the quantity of fuel injected from an injector into the served cylinder changes due to the change in the fuel pressure in the fuel rail while the injector is being actuated. This situation is depicted with the lowermost pulse train form in FIG. 2, illustrating a fuel injection quantity per unit time. As compared with the case (corresponding to the leftmost pulse) where the injector is actuated while the high-pressure fuel pump is discharging fuel to the rail, the net fuel quantity discharged per injection decreases in the case (corresponding to the central and rightmost pulses) where the injector is actuated while the high-pressure fuel pump is not discharging fuel to the rail. Accordingly, for the same injection pulse width, the air-fuel ratio for internal combustion engine varies depending on the temporal relationship between the time for actuating the injector and the time for discharging fuel from the high-pressure fuel pump to the fuel rail.

Figure 3:
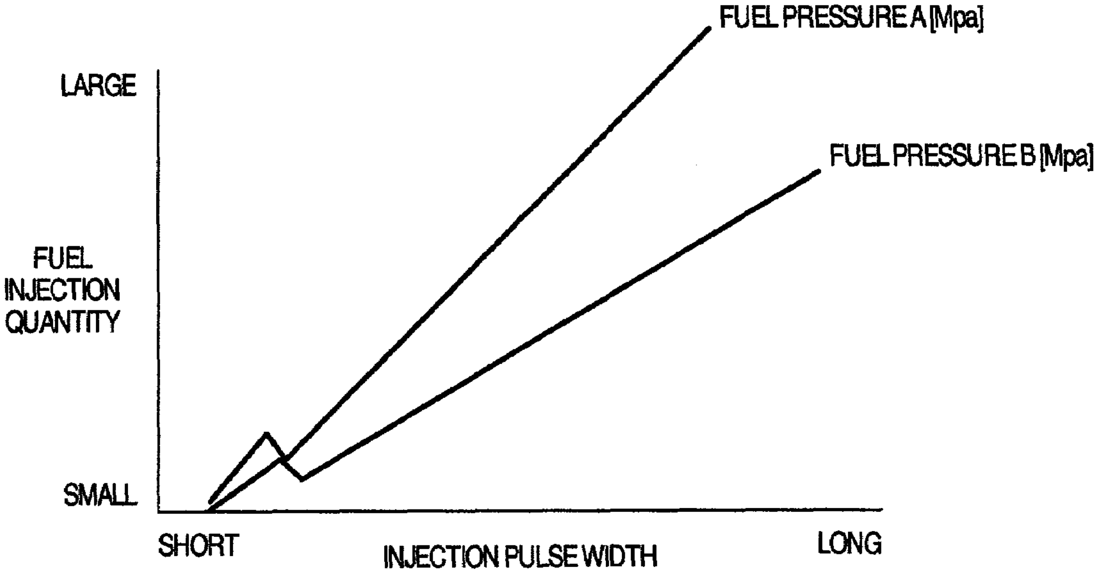
FIG. 3 graphically shows the relationship between injection pulse width and injected fuel quantity, for various fuel pressures in the fuel rail, observed in this invention.

FIG. 3 graphically shows the relationship between injection pulse width and injected fuel quantity, for various fuel pressures in the fuel rail, observed in this invention.

Fuel injection quantity (ordinate in FIG. 3) increases as the width (abscissa in FIG. 3) of the pulse signal for actuating the injector is increases. It is also seen from this graph that for the same pulse width, the higher is the fuel pressure in the fuel rail, the larger is the fuel injection quantity from the injector.

As shown in FIG. 3, as the quantity of fuel injected from the injector varies depending on the fuel pressure, control of the injector is necessary depending on the fuel pressure developed during the injection of fuel from the injector. This control of the injector allows stabilized control of fuel injection and improves the precision in control of air-fuel ratio.

Figure 4:
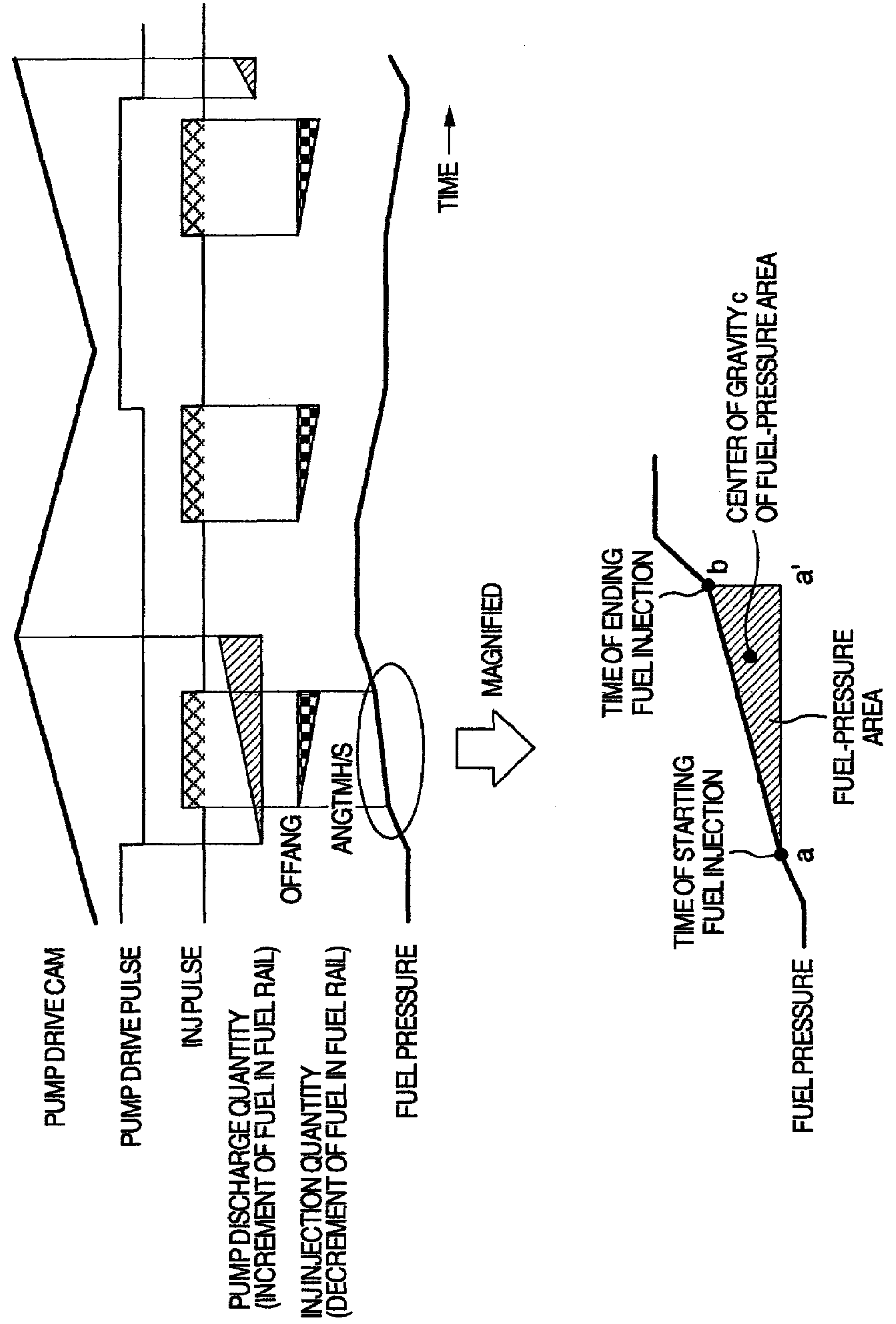
FIG. 4 graphically shows the variables changing with time, associated with the operations of the high-pressure fuel pump and the injectors, and the fuel pressure, observed in this invention.

FIG. 4 graphically shows the variables changing with time, associated with the operations of the high-pressure fuel pump and the injectors, and the fuel pressure, observed in this invention.

As shown in FIG. 4, which is similar to FIG. 1, the actuator for the high-pressure fuel pump is reciprocated by the pump drive cam whose motion is indicated by the chevron waveform.

The pump drive pulse signal represented by the pulse train form just below the chevron waveform causes the high-pressure fuel pump to discharge fuel to the fuel rail. In FIG. 4, the high-pressure fuel pump starts discharging fuel to the fuel rail at the moment that the pump drive pulse signal turns off. However, the relationship between the on/off of the pulse signal and the time for the high-pressure fuel pump to start discharging fuel to the rail is not restrictive here. The high-pressure fuel pump may start discharging fuel to the rail when the pulse signal turns on. In the following description of this invention, the case is treated where the high-pressure fuel pump starts discharging fuel to the fuel rail at the moment that the pump drive pulse signal turns off.

The pump discharge quantity shown in FIG. 4 indicates the increment of fuel in the fuel rail resulting from the discharge of fuel from the high-pressure fuel pump to the fuel rail from the moment that the pump drive pulse signal turns off till the moment that the top dead center of the pump drive cam (peak of chevron waveform) is reached. The total quantity of fuel discharged from the high-pressure fuel pump to the fuel rail during the period between the above mentioned two moments, is indicated by the hatched triangle associated with the pump discharge quantity in FIG. 4. (The base of the triangle represents the shift of the crank shaft angle or the rotational time of the crank shaft, of internal combustion engine during that period while the height of the triangle denotes the total quantity of fuel discharged to the rail by the pump during the same period.)

The INJ pulse in FIG. 4 is the pulse signal supplied to the injector. While the pulse signal is of ON state, i.e. at high level, the injector is open and continues to injection out fuel. The total quantity of fuel injected out of the injector during the period for which the injector is open due to the actuation by the INJ pulse signal, is indicated by the checkered triangle associated with the INJ injection quantity in FIG. 4. (The base of the triangle represents the shift of the crank shaft angle or the rotational time of the crank shaft, of internal combustion engine during that period while the height of the triangle denotes the total quantity of fuel injected by the injector during the same period.)

Thus, the fuel pressure in the fuel rail changes as indicated by the “fuel pressure” curve shown at the bottom of FIG. 4, as a balance of the fuel intake and the fuel outflow (i.e. the incoming fuel is the total quantity of fuel discharged to the fuel rail by the high-pressure pump while the outgoing fuel is the total quantity of fuel injected by the injector.). As the fuel pressure in the fuel rail rises with the fuel discharge from the high-pressure fuel pump and falls with the fuel injection from the injector, the pressure of fuel injected from the injector varies depending on whether or not the period of the fuel discharge from the high-pressure fuel pump overlaps the period of the fuel injection from the injector. For example, when the two periods overlap, the fuel pressure tends to increase while it tends to decrease when the two periods do not overlap. Accordingly, for the same injector pulse width, the quantity of fuel injected out of the injector may vary, as mentioned above in relation to FIG. 3. The magnified picture in FIG. 4 shows an example of a partial fuel pressure curve which corresponds to a case where the period of the fuel discharge from the high-pressure fuel pump overlaps the period of the fuel injection from the injector.

The fuel pressure-area is defined for convenience as a hatched triangle having vertices a, b and a' shown in the magnified picture, wherein the vertex a corresponds to the fuel pressure at the time of starting the fuel injection from the injector, the vertex b to the fuel pressure at the time of ending the fuel injection from the injector, and the vertex a' to the same fuel pressure as at the vertex a at the time of ending the fuel injection from the injector. Additionally, the fuel pressure c is defined as shown also in the magnified picture, as located at the center of gravity of the hatched triangle aba'. By calculating the value for this point c of gravitational center and using the value for the control of fuel injection, it becomes possible to provide an accurate control of fuel injection even if the fuel pressure fluctuates.

According to this invention, the fuel pressure in the fuel rail during the period of fuel injection from the injector is calculated on the basis of the quantity of the fuel discharged from the high-pressure fuel pump to the fuel rail and the quantity of the fuel injected from the injector into the cylinder, during the period of fuel injection, whereby a injection control for injector (i.e. correction of injection pulse width) is performed depending on the calculated fuel pressure.

Figure 5:
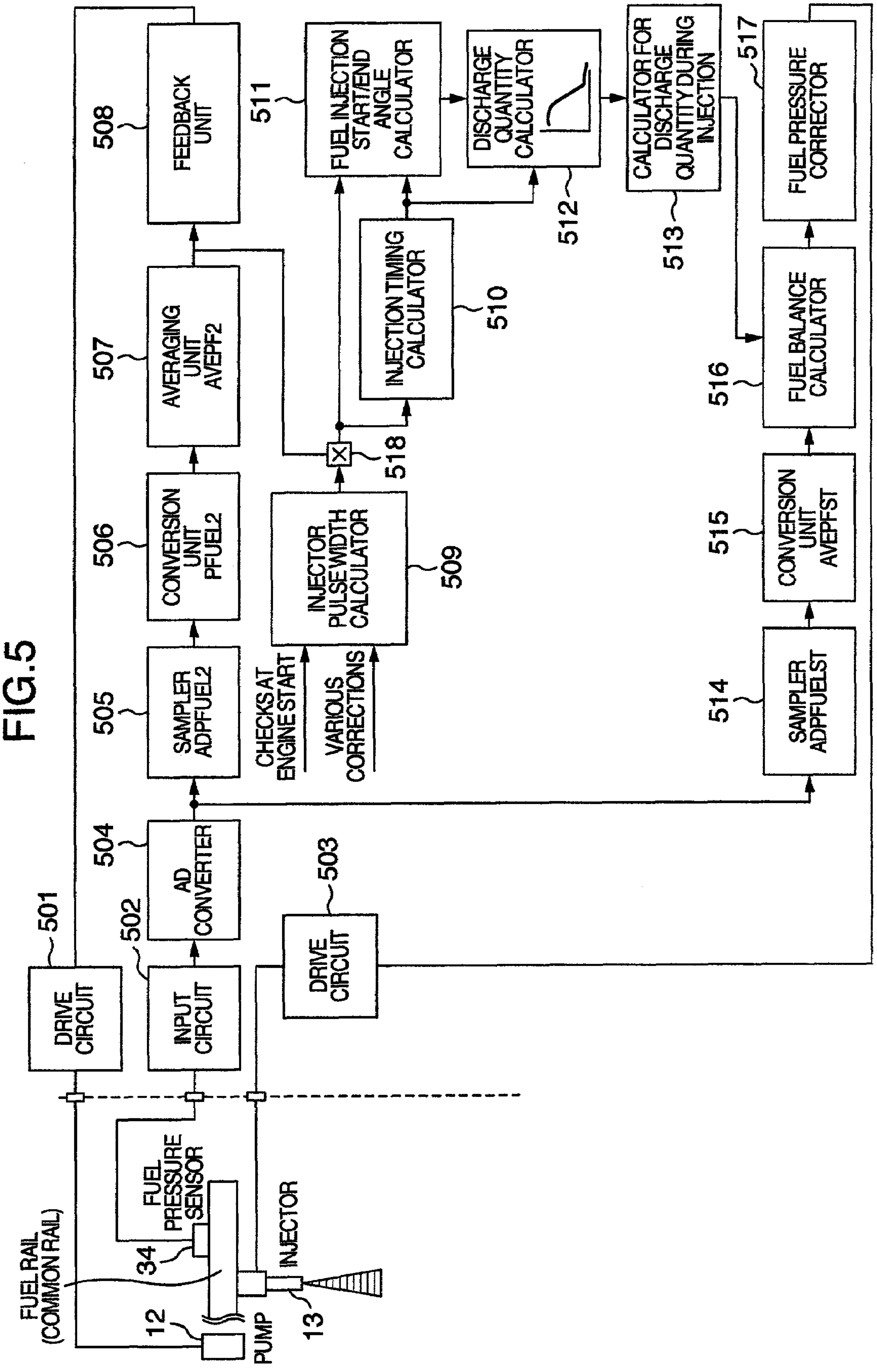
FIG. 5 shows in block diagram a method for controlling each injector according to this invention.

FIG. 5 shows in block diagram of a method for controlling each injector according to this invention. In FIG. 5, the block diagram to the right of the vertical dashed line consists of the respective steps of the program executed by the CPU 26 shown in FIG. 1 to control the fuel injection from the injectors. It is noted, however, that a pump drive circuit 501, an injector drive circuit 503 and an input circuit 502 are respectively electric circuits realized as hardware, and these circuits are located in the control unit 15.

In FIG. 5, steps are described as equivalent circuit components such as means for performing respective functions.

The input circuit 502 receives the output of the fuel pressure sensor 34 set in the fuel rail and is provided with a filter for eliminating noise such as higher harmonics and so on. An AD converter 504 converts the output of the input circuit 502 into digital signal. A sampler 505 serves to sample the digital signal out of the AD converter 504 at regular intervals, e.g. every 2 ms, and the output of the sampler 505 is changed to a physical value by means of a conversion unit 506 (e.g. the voltage in mV as the output of the fuel pressure sensor is changed into the pressure in MPa as the output of the transducer 506). An averaging unit 507 provides filtering treatment for pulsating pressure of fuel in the fuel rail (the reason why the fuel pressure in the rail pulsates has been described in relation to FIG. 4) to obtain averages (e.g. moving averages or weighted averages). A feedback unit 508 performs feedback control whereby a target fuel pressure can be obtained on the basis of the fuel pressure value obtained as a result of filtering treatment in the averaging unit 507. The pump drive circuit 501 drives and controls the solenoid of the high-pressure fuel pump on the basis of the output of the feedback unit 508 and the signal for driving the high-pressure fuel pump (i.e. pulse for starting the discharge of fuel from the high-pressure fuel pump) obtained through a pre-programmed open control.

A fuel injection quantity calculator 509 calculates desired injector pulse widths depending on the operating conditions of the internal combustion engine. A multiplier 518 makes the product of the outputs of the averaging unit 507 and the fuel injection quantity calculator 509. A fuel injection timing calculator 510 calculates the time at which the injector starts injecting fuel, depending on the product value obtained by the multiplier 518. An injection start/end angle calculator 511 calculates the time at which the injector starts injecting fuel and the time at which the injector stops injecting fuel, on the basis of the injection pulse width obtained by the injector pulse width calculator 509 and the injection timing obtained by the fuel injection timing calculator 510. A fuel discharge quantity calculator 512 creates a preset discharge quantity map used for the high-pressure fuel pump to discharge fuel to the fuel rail, on the basis of the output of the fuel injection timing calculator 510 and the output of the injection start/end angle calculator 511. A calculator 513 calculates, on the basis of the preset discharge quantity map, the quantity of fuel to be discharged from the high-pressure fuel pump to the fuel rail while the injector is injecting fuel. As the quantity of fuel injected by the injector has been calculated by the injection pulse width calculator 509, a fuel balance calculator 516 calculates the balance of fuel in the fuel rail while the injector is injecting fuel, on the basis of the quantity of fuel injected by the injector calculated by the calculator 509 and the quantity of fuel, calculated by the calculator 513, to be discharged from the high-pressure fuel pump to the fuel rail while the injector is injecting fuel. A sampler 514 samples the output of the fuel pressure sensor in synchronism with the time at which the injector starts injecting fuel so that the sampled quantity may be used as the fuel pressure value at the time of starting fuel injection. A conversion unit 515 changes the sampled fuel pressure value, e.g. voltage in mV, into another physical value, e.g. pressure in MPa. A fuel pressure corrector 517 corrects the actual fuel pressure for the injector on the basis of the sampled fuel pressure at the time of starting fuel injection obtained by the conversion unit 515 and the fuel balance calculated by the fuel balance calculator 516, so that the injector drive circuit 504 controls the injector (shown in FIG. 5).

In this way, it is possible to determine the fuel pressure while the injector is open (injecting fuel) on the basis of the fuel pressure at the time of starting fuel injection and the fuel balance while the injector is injecting fuel, and therefore to provide fuel injection control with high precision.

Figure 6:
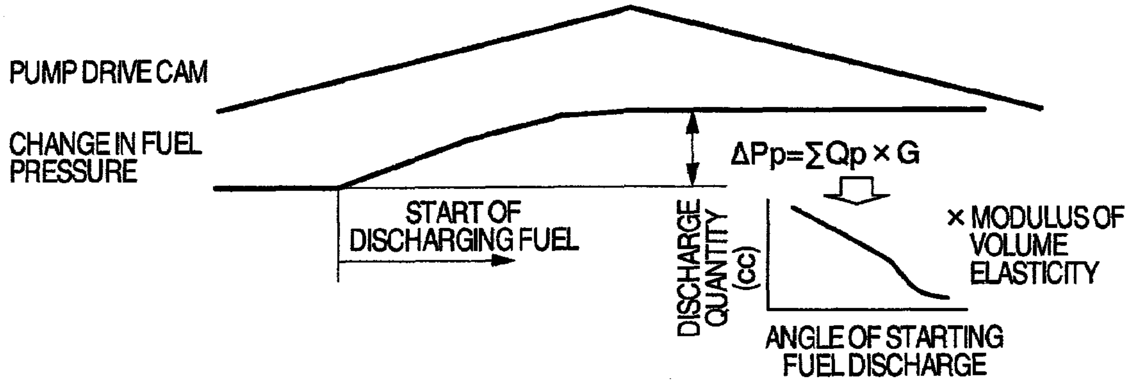
FIG. 6 is a graph illustrating a procedure for obtaining the quantity of fuel discharged from the high-pressure fuel pump according to this invention.

FIG. 6 is a graph illustrating a procedure for obtaining the quantity of fuel discharged from the high-pressure fuel pump according to this invention.

In FIG. 6, the chevron waveform represents the motion of the cam to drive the high-pressure fuel pump reciprocally as described in relation to FIG. 4. The signal form below the chevron represents the fuel pressure changing with time, illustrating the situation that the fuel pressure in the fuel rail rises as the high-pressure fuel pump starts discharging fuel (at the position indicated by the right-directed arrow) to the fuel rail in response to the pulse signal that controls the fuel discharge from the high-pressure fuel pump. The fuel pressure increment $\Delta P$ caused as a result of the fuel discharge from the high-pressure fuel pump is determined depending on the total quantity $\Sigma Qp$ of fuel discharged from the high-pressure fuel pump and the modulus of elasticity of the fuel. The total quantity of fuel discharged from the high-pressure fuel pump, pictured by the graphical representation inserted in FIG. 6, can be obtained depending on the time at which the high-pressure fuel pump starts discharging fuel to the fuel rail. As illustrated in the graphical representation, the earlier is the time of starting fuel discharge (or the smaller is the corresponding crank shaft angle), the larger is the quantity of fuel discharge from the high-pressure fuel pump. Or inversely, the later is the time, the smaller is the discharge quantity. Such discharge quantity may be previously calculated by and stored as a map in, the control unit for the internal combustion engine. Such a map for discharge quantity can be calculated by using both of the fuel discharge timing and the rotational speed of the engine or at least one of them. Accordingly, the quantity of fuel discharged from the high-pressure fuel pump can be accurately obtained.

Figure 14:
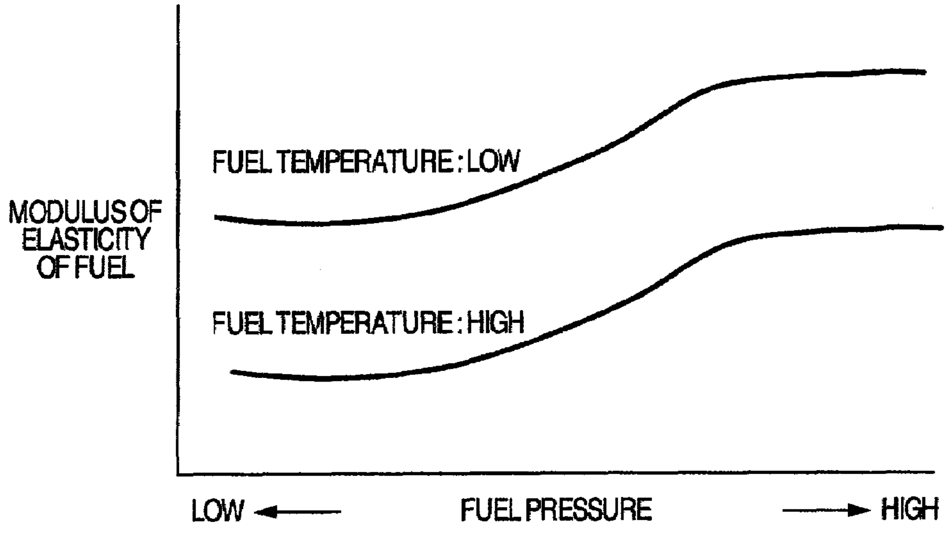
FIG. 14 graphically shows the modulus of elasticity of fuel used in this invention.

FIG. 14 graphically shows the characteristic of the modulus of elasticity of fuel used in this invention.

As described above in relation to FIG. 6, the modulus of elasticity of fuel must be accurately determined to calculate fuel pressure from the quantity of fuel. The determination of the modulus of elasticity of fuel is one of the items subjected to correction necessary to maintain the precision of fuel injection control described later as an embodiment of this invention. As shown in FIG. 14, it is known that the modulus of elasticity of fuel changes with the temperature and pressure of the fuel. From this fact, the modulus of elasticity of fuel used to convert fuel quantity to fuel pressure can be calculated by using fuel temperature and pressure. For example, fuel temperature can be measured by a fuel temperature sensor that directly measures the temperature of fuel concerned, or estimated from the temperature of the engine coolant. Further, the modulus of elasticity of fuel can be calculated from the map created on the basis of the fuel temperature and the output of the fuel pressure sensor set in the fuel rail. Moreover, any procedure capable of estimating the modulus of elasticity of fuel may be employed without using calculation based on the map.

Figure 7:
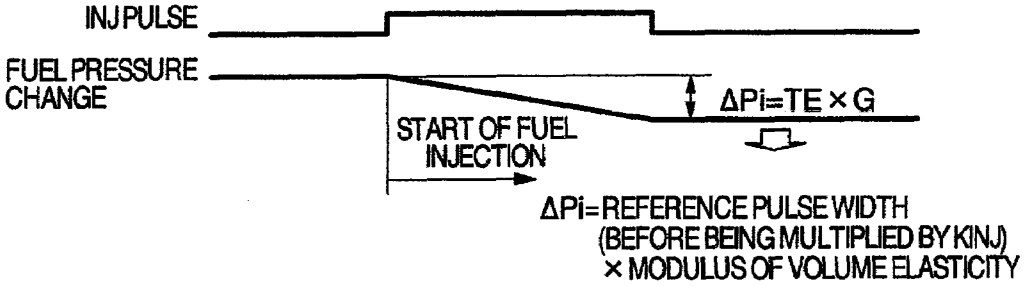
FIG. 7 is a graph illustrating a procedure for obtaining the quantity of fuel injected from the injector according to this invention.

FIG. 7 is a graph illustrating a procedure for obtaining the quantity of fuel injected from the injector according to this invention.

In FIG. 7, the pulse signal for controlling the injector is indicated by "INJ pulse". The high level of the pulse signal corresponds to the period during which the injector is injecting fuel. The high level of the signal drives the injector valve open, the fuel in the fuel rail is injected through the injector, and the pressure of the fuel in the fuel rail falls as shown with the "fuel pressure change" curve in FIG. 7. The decrement $\Delta P$ in the fuel pressure can be determined on the basis of the quantity TE of the fuel injected out of the injector and the quantity TE of the fuel injected out of the injector. It is noted here that the quantity TE of the fuel injected out of the injector can be calculated from the expression that multiplies the quantity TE of the fuel injected out of the injector with the width of the reference pulse corresponding to the injection period for the injector. It is also noted here that in calculation the reference pulse width should preferably be substituted by the pulse width required by the engine before the correction of the fuel pressure and that doing so makes calculation procedure easier (i.e. a simple linear expression can be used).

As described above with reference to FIGS. 6 and 7, the fuel balance in the fuel rail can be basically calculated. However, the calculation of the fuel balance while the fuel is being injected from the injector makes it necessary to precisely determine the period during which the fuel is being discharged from the high-pressure fuel pump and the period during which the fuel is being injected from the injector. Therefore, this situation will be described below with reference to FIGS. 8 and 10.

Figure 8:
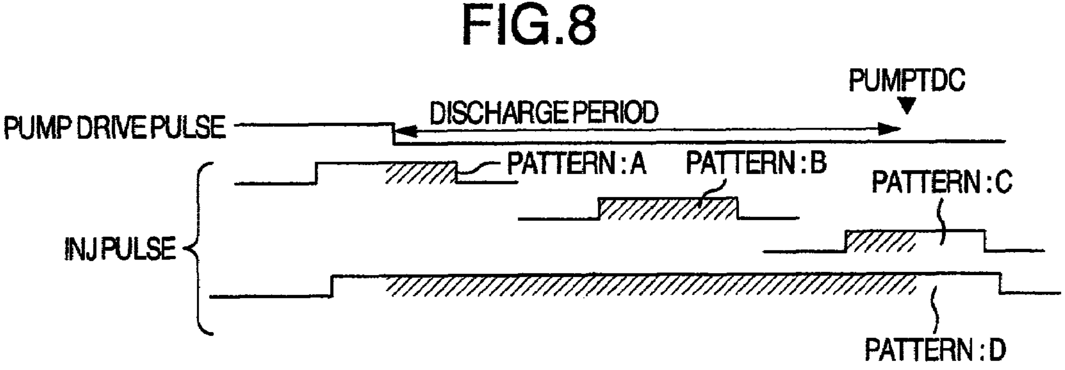
FIG. 8 graphically shows the relationship between the fuel injection from the injector and the fuel discharge from the high-pressure fuel pump, observed in this invention.

FIG. 8 graphically shows the relationship between the fuel injection from the injector and the fuel discharge from the high-pressure fuel pump, observed in this invention.

In FIG. 8, the uppermost pulse signal "Pump Drive Pulse" is that which controls the period of fuel discharge from the high-pressure fuel pump. This period is defined as the interval between the time at which the pump drive pulse signal falls to its low level and the time at which the top dead center of the pump drive cam is reached (corresponding to PUMPTDC in FIG. 8). The fuel discharge from the high-pressure fuel pump while the injector is injecting fuel varies depending on the fuel injection timing and the injector pulse width. This situation is illustrated with "INJ pulse" signals appearing below the pump drive pulse signal in FIG. 8. For convenience of description, FIG. 8 shows as if injectors serving plural cylinders are injecting fuel in their turns. However, this picture should not be interpreted as if the injectors actually injection fuel in this way. This picture is actually intended to show in a single picture various cases where the pump discharge period and the injector injection period overlap differently.

For the fuel injection pattern A, the injector injection period overlaps with the pump discharge period at and after the middle of the corresponding injector pulse duration. It is noted here for the purpose of interpretation of the picture that the hatched intervals for pulse signals in FIG. 8 indicate the overlaps of the corresponding injector injection periods with the pump discharge period and that the non-hatched portion within the pulse form means the absence of such an overlap.

For the fuel injection pattern B, the entire injector injection period overlaps with the pump discharge period. For the pattern C, the overlap occurs before the middle of the corresponding injector pulse duration. For the pattern D, the overlap starts and ends within the corresponding injector pulse duration, leaving non-overlapping periods in the beginning and end of the injection pulse duration. In this way, there are various cases where different overlaps occur between the injector injection period and the pump discharge period. Accordingly, a control apparatus for an internal combustion engine is required which can adapt itself for such various overlap patterns.

Figure 9:
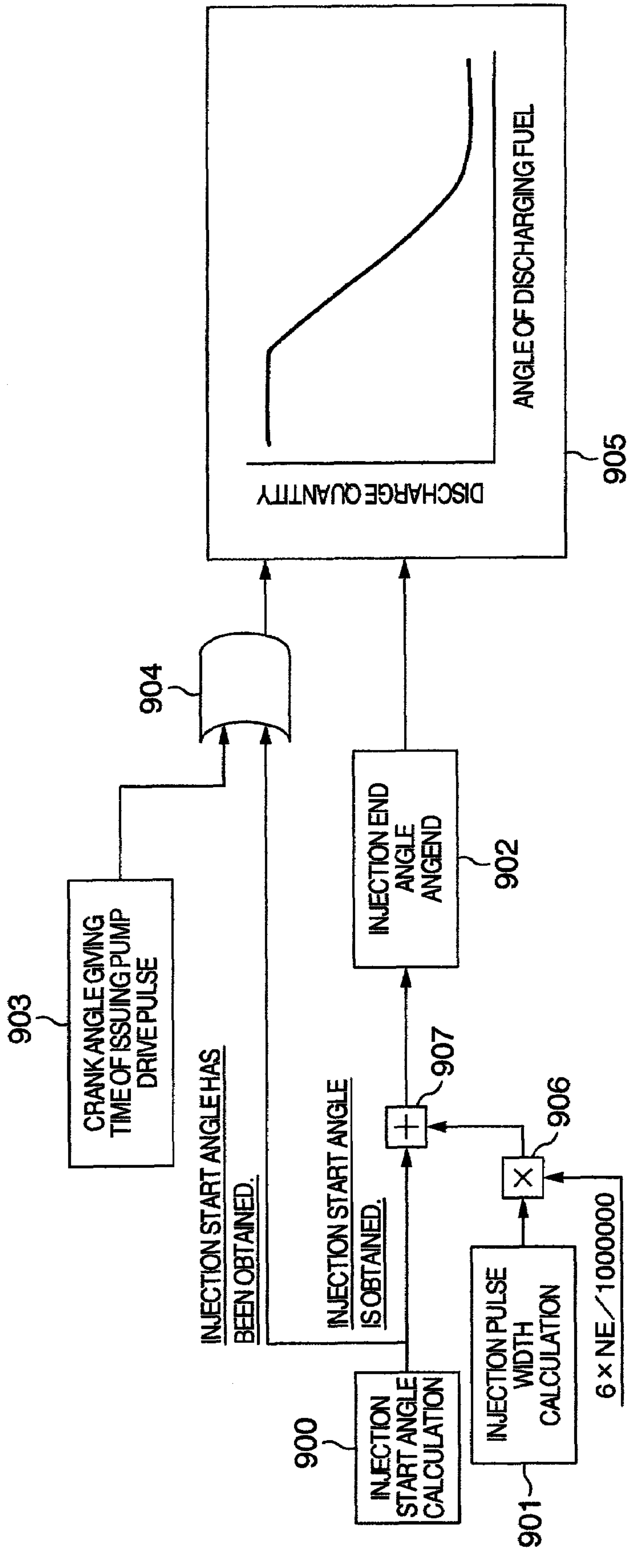
FIG. 9 diagrammatically shows a procedure for obtaining the quantity of fuel discharged from the high-pressure fuel pump during fuel injection, according to this invention.

FIG. 9 diagrammatically shows a procedure for obtaining the quantity of fuel discharged from the high-pressure fuel pump during the period of fuel injection from injector, according to this invention.

This procedure shown as a block diagram in FIG. 9 illustrates the detail of the function performed by the calculator 513 shown in FIG. 5.

First, in block 900, the injection start angle (i.e. fuel injection start crank angle) corresponding to the time of starting fuel injection from injector is calculated on the basis of the operating condition of engine. On the other hand, a required injection pulse width is also calculated in block 901 on the basis of the operating condition of engine. The required injection pulse width is measured in microsecond (μs). The required injection pulse width is converted to the corresponding crank angle depending on the information on the rotational speed of the engine. This conversion can be performed by multiplying, through a multiplier 906, the required injection pulse width in microsecond (μs) calculated in block 901 by 6 times the engine speed value NE (rpm) divided by 1,000,000. Then, the injection end angle (902) can be calculated by adding, through an adder 907, the crank angle obtained by the multiplier 906 to the injection start angle obtained in block 900 (this means that injection end angle=injection start angle+crank angle). The quantity of fuel to be discharged from the high-pressure fuel pump during the period of fuel injection can be calculated by finding the injection start and end angles in the preset map 903 in the discharge characteristic of the high-pressure fuel pump. In order to adapt to the different overlaps between the fuel injection period and the fuel discharge period as shown above in FIG. 8, the quantity of fuel to be discharged from the high-pressure fuel pump during the period of fuel injection must be obtained by selecting, by means of an OR logic (as block 904), the later (i.e. corresponding to retarded angle) of the time of starting fuel injection, calculated in block 900, and the time of issuing the pump drive pulse, calculated in block 903, and then by referring to the map. Thus, the quantity of fuel to be discharged from the high-pressure fuel pump during the period of fuel injection can be accurately calculated.

Figure 10:
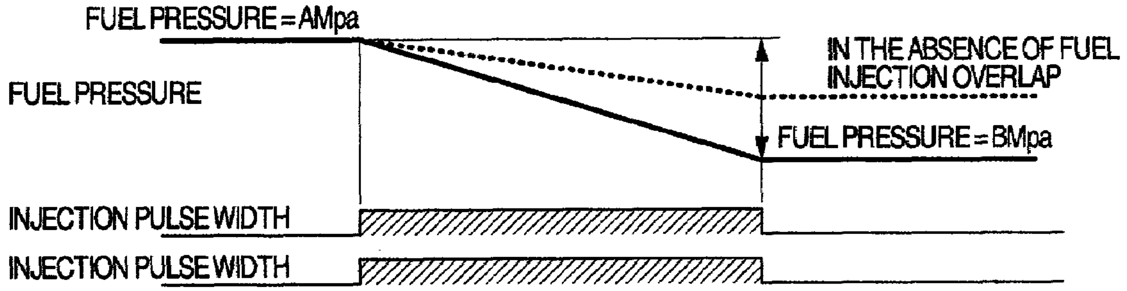
FIG. 10 graphically shows the change in the fuel pressure when plural injectors injection fuel simultaneously, observed in this invention.
Figure 11:
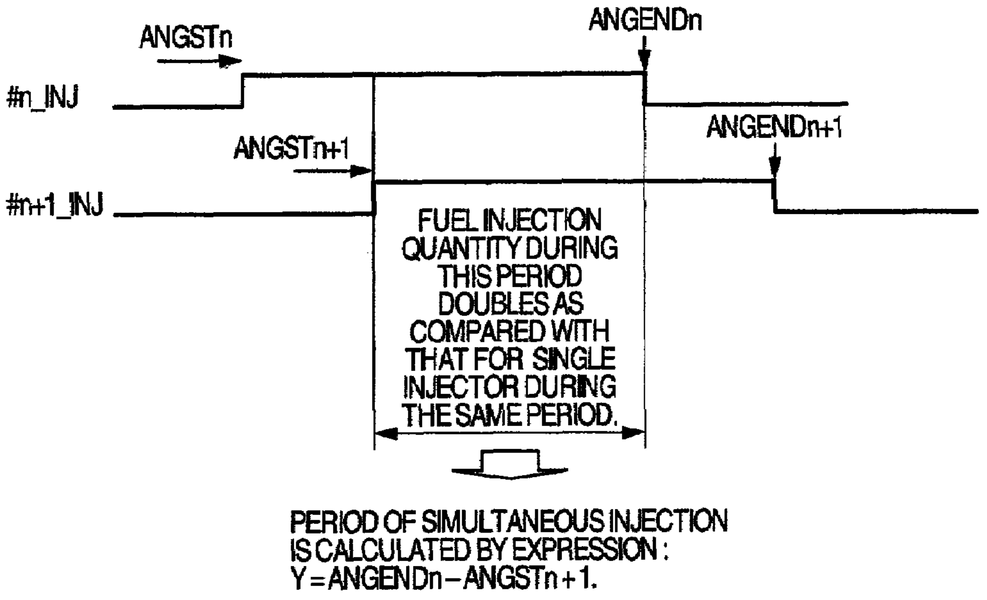
FIG. 11 graphically shows the situation where two fuel injection periods overlap partially, observed in this invention.

FIGS. 10 and 11 show a case where the fuel injection periods for plural injectors overlap.

While description is made of the operation with a single injector in FIG. 8, the operation with plural injectors will be described here.

FIG. 10 illustrates the change in the fuel pressure in the fuel rail when the injection periods of two injectors serving two cylinders overlap fuel injections at a same time. When two injectors injection fuel simultaneously, the quantity of fuel discharged from the fuel rail and injected through the two injectors is twice the quantity of fuel discharged from the fuel rail and injected through a single injector. Accordingly, the depression of the fuel pressure in the fuel rail for the simultaneous injections of fuel is also twice as large as that for the fuel injection through the single injector. It, therefore, is not sufficient to solely control the fuel injection timing and the fuel pump discharge timing to cope with the simultaneous injection of fuel. It is necessary to analyze how the two injection periods overlap and provide injection control in accordance with the degree of overlap between the two fuel injection periods.

FIG. 11 shows an analytical procedure in a case where two injection periods overlap. In FIG. 11, the time of starting fuel injection from one injector for the #n cylinder is denoted by ANGSTn and the time of ending fuel injection from the same injector is indicated by ANGENDn. The sign "n" represents a positive integer other than zero. The calculation of the time for ending fuel injection from injector is performed as described above in relation to FIG. 9. Now, the time of starting fuel injection and the time of ending fuel injection, for the #n+1 cylinder are denoted by ANGSTn+1 and ANGENDn+1, respectively. When the periods of fuel injection from the two injectors for the two cylinders #n and #n+1 overlap as shown in FIG. 11, the period of simultaneous fuel injection is calculated by the expression such that ANGENDn−ANGSTn+1. In this description, it is assumed for simplicity that the fuel injection from the injector for the #n cylinder precedes that for the #n+1 cylinder. However, if the order of fuel injection for the cylinders is not clearly determined, the period of simultaneous fuel injection can be calculated by using the expression such that min(ANGENDn, ANGENDn+1)−max (ANGSTn, ANGSTn+1). Here, min(ANGENDn, ANGENDn+1) means the smaller of ANGENDn and ANGENDn+1, and max(ANGSTn, ANGSTn+1) the greater of ANGSTn and ANGSTn+1.

Thus, the period of simultaneous fuel injection can be calculated. This situation will be described later with reference to a flow chart shown in FIG. 13.

Figure 12:
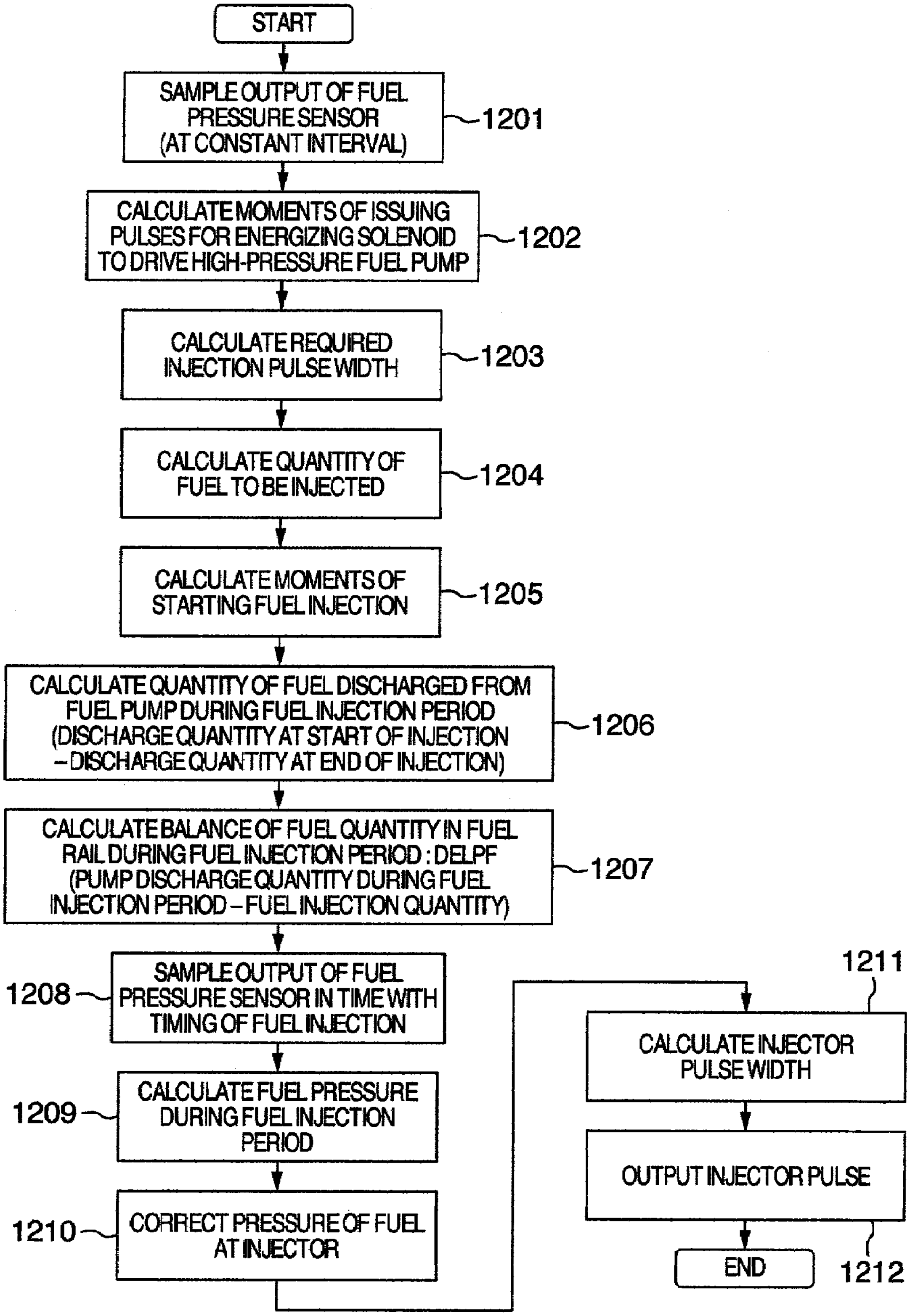
FIG. 12 is a flow chart for the fuel injection control according to this invention.

FIG. 12 a flow chart for the fuel injection control method according to this invention. The operations performed in the respective steps in FIG. 12 are executed by the CPU 26 shown in FIG. 1 according to the preloaded programs.

In step 1201, the output of the fuel pressure sensor set in the fuel rail is sampled at a constant interval of, for example, 2 ms. In step 1202, the moments of issuing pulses for energizing the solenoid to drive the high-pressure fuel pump are calculated depending on a series of fuel pressure values obtained through sampling in step 1201. In step 1203, a required injection pulse width is calculated depending on the operating condition of the internal combustion engine. In step 1204, the quantity of fuel to be injected is calculated depending on the injection pulse width calculated in step 1203. It is noted here that the injection pulse width can be converted to the corresponding quantity of fuel to be injected depending on the injection characteristic of the injector. Such conversion can be made through calculation using a linear expression from the injector injection characteristic shown in FIG. 3. For example, an operation to render the fuel pressure value dimensionless is performed using the effective injector pulse width (pulse width corresponding to the period during which the injector is actually open), and the dimensionless fuel pressure value (not representing proper correction of pressure of fuel injected through injector) is multiplied by the gradient of the injector injection characteristic curve previously obtained. This situation has been described in relation to FIG. 7.

In step 1205, the time of starting fuel injection from injector is calculated depending on the operating condition of the engine. In step 1206, the quantity of fuel discharged from the high-pressure fuel pump during the fuel injection period is calculated, as described in reference to FIG. 9. In step 1207, the balance of the fuel quantity in the fuel rail during the period for which fuel is being injected out of the injector is calculated by obtaining the difference between the quantity of fuel injected out of the injector calculated in step 1204 and the quantity of fuel discharged from the high-pressure fuel pump during the fuel injection period calculated in step 1206. In step 1208, as in step 1201, the output of the pressure sensor set in the fuel rail is sampled. Then, in step 1209, the change in the fuel pressure while fuel is being injected out of injector is calculated on the basis of the fuel pressure values obtained in step 1208 through sampling synchronized with the injection start timing and the fuel balance obtained in step 1207. Here, it is noted that the change in the fuel pressure=the fuel pressure at the time of starting fuel injection−the fuel pressure drop during the fuel injection. Such fuel pressure change during fuel injection can be readily calculated from the fuel balance in the fuel rail during the fuel injection period, as described in relation to FIGS. 6 and 7. In step 1210, the pressure of fuel injected out of the injector is corrected on the basis of the fuel pressure value obtained by multiplying with a predetermined ratio the value calculated in step 1209, i.e. the value equivalent to the center of gravity for the fuel pressure area as described in FIG. 4, or the fuel pressure value obtained through sampling and calculations in steps 1208 and 1209. In step 1211, the injector pulse width, i.e. the width of the pulse applied to the actuator winding of the injector concerned, is calculated by using the corrected pressure value obtained in step 1210 and the pulse signal having the calculated pulse width is delivered to the actuator winding of the injector in step 1212.

Figure 13:
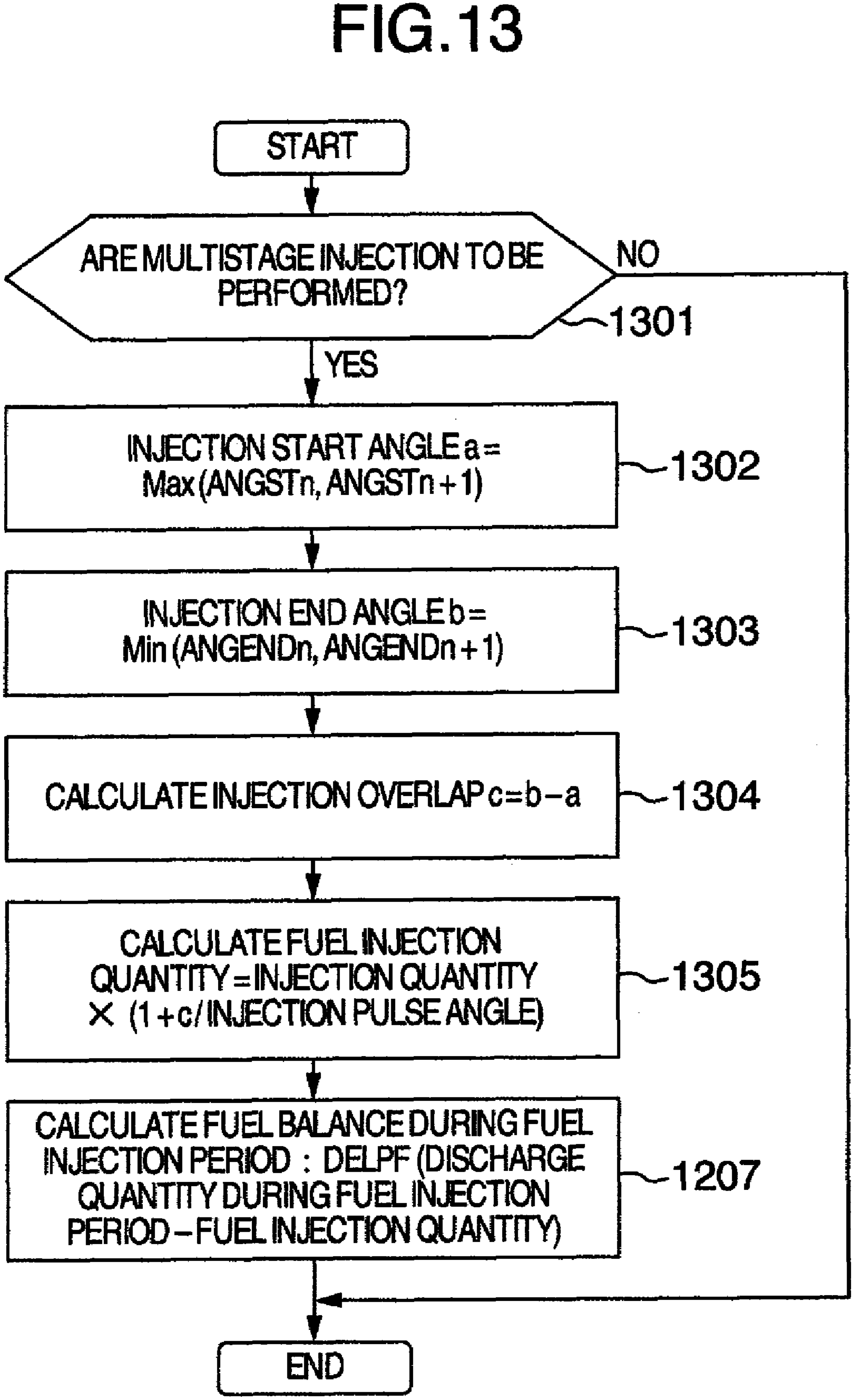
FIG. 13 is a flow chart for the fuel injection control according to this invention wherein the fuel injection periods overlap.

FIG. 13 is a flow chart for the injection control method according to this invention wherein the fuel injection periods overlap. The operations performed in the respective steps in FIG. 13 are executed by the CPU 26 shown in FIG. 1 according to the preloaded programs.

In step 1301, decision is made on whether or not the multistage injections are performed (that is, whether or not plural number of injections are performed for the same cylinder, e.g. the plural injections are divided into one group taking place in the intake stroke and the other in the compression stroke). When the decision is made that such multistage injections are performed, the time a for starting fuel injection is calculated depending on the times of starting fuel injection for plural cylinders in step 1302. The fuel injection start time a has been mentioned in relation to FIG. 11. In step 1303, the fuel injection end time b is calculated. This calculation has also been mentioned in relation to FIG. 11. In step 1304, the period during which injectors inject fuel simultaneously, i.e. injection overlap period c, is calculated on the basis of the values calculated in steps 1302 and 1303. In step 1305, the total quantity of injected fuel is calculated when the periods of fuel injection for plural cylinders overlap. As described above in relation to FIGS. 10 and 11, if there is an overlap of the periods of fuel sprays from plural injectors, fuel discharge from the fuel rail is greater for the overlapping injections than for fuel injection from a single injector, during the period of injection overlap. The discharge quantity for the overlapping injections can be obtained by adding the fuel injection quantity for a single injector to the fuel injection quantity for a single injector times the injection overlap period c calculated in step 1304 divided by injection pulse angle. In step 1207, as described in relation to FIG. 12, the fuel balance in the fuel rail for the fuel injection period is calculated in like manner. Thus, even if there is an overlap of fuel sprays from plural injectors for the respective cylinders, the fuel balance in the fuel rail during the period of overlapping injections can be accurately calculated so that a precise fuel injection control can be achieved.

Figure 16:
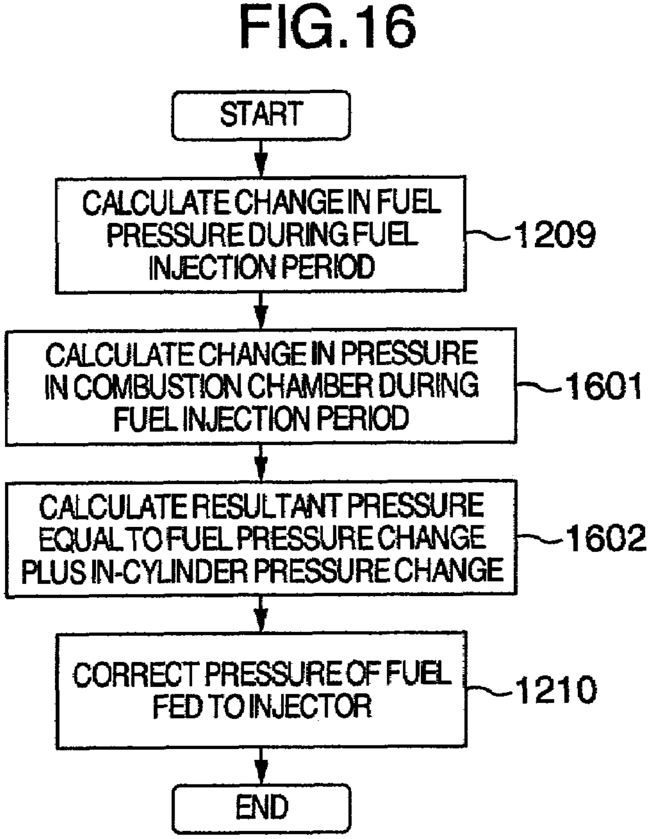
FIG. 16 is a flow chart for correcting the pressure of fuel fed to the injector in accordance with the change in the pressure in the combustion chamber, according to this invention.

FIG. 16 is a flow chart for correcting the pressure of fuel fed to the injector in accordance with the change in the pressure in the combustion chamber (i.e. cylinder), according to this invention. The operations performed in the respective steps in FIG. 16 are executed by the CPU 26 shown in FIG. 1 according to the preloaded programs.

In step 1209, as described in relation to FIG. 12, the change in the fuel pressure during the fuel injection period is calculated. In step 1601, the change in the pressure in the combustion chamber of engine is calculated during the fuel injection period. Up to this point, with reference to FIGS. 2 through 13, description has been given to a method of controlling fuel injection on the basis of the change in the fuel pressure in the fuel rail. The change in the pressure at the nozzle of injector can actually affect the injection characteristic of injector. Therefore, for the same fuel pressure and the same injection pulse width, the quantity of fuel injected into the cylinder is less for higher in-cylinder pressure than for lower in-cylinder pressure. Thus, fuel injection control with higher precision can be performed by carrying out the control of fuel injection depending on the change in the pressure in the combustion chamber of engine during the fuel injection period. The pressure change in the combustion chamber of engine will be described later with reference to FIG. 15. In step 1602, the change in the fuel pressure in the fuel rail during the fuel injection period mentioned in relation to FIG. 12 is added to the change in the in-cylinder pressure calculated in step 1601 so that the resultant pressure change during the fuel injection period can be obtained. In step 1210, as described in relation to FIG. 12, the pressure of fuel fed to the injector is corrected accordingly.

Figure 15A:
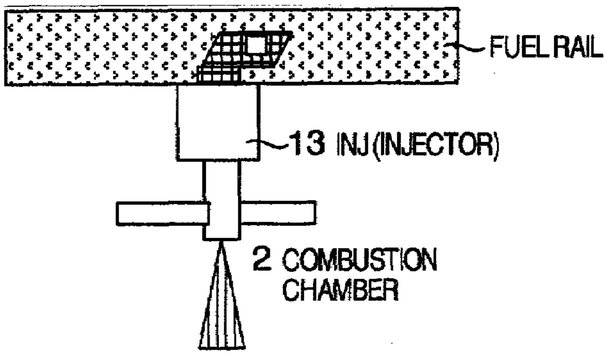
FIG. 15A pictures the positional relationship between the fuel rail (upstream of the injector) and the combustion chamber (downstream of the injector)
Figure 15B:
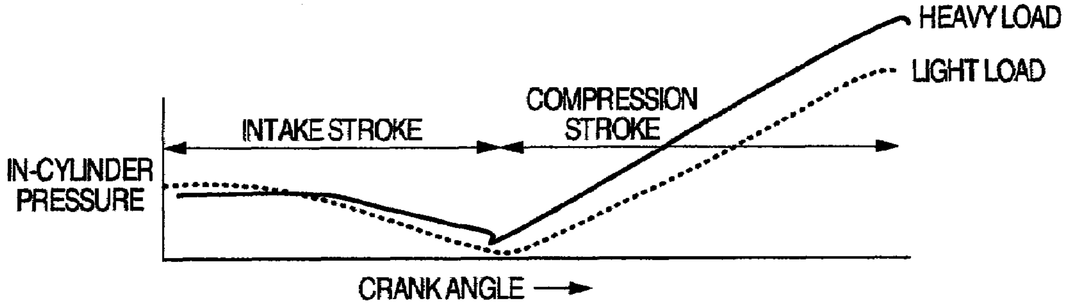
FIG. 15B graphically shows the change in the pressure in one of the combustion chambers, observed in this invention.

FIG. 15A pictures the positional relationship between the fuel rail (upstream of the injector) and the combustion chamber (downstream of the injector) and FIG. 15B graphically shows the change in the pressure in one of the combustion chambers, observed in this invention. When fuel is injected into the combustion chamber, the pressure difference between the fuel pressure in the fuel rail and the pressure in the combustion chamber forces fuel into the combustion chamber during the fuel injection period. Accordingly, not only the fuel pressure in the fuel rail but also the pressure in the combustion chamber must be corrected during the fuel injection period in order to accurately control the fuel injection through the injector. With both the pressures corrected, a much more precise fuel injection control can be achieved.

FIG. 15B graphically shows the change in the pressure in one of the combustion chambers of a 4-cycle internal combustion engine in its intake and compression stroke. As so much is known about the pressure in the combustion chamber, it will not be necessary here to give a detailed description about it. In short, the in-cylinder pressure falls in the intake stroke and rises in the compression stroke. The in-cylinder pressure depends on the operating condition of the engine. Namely, the pressure is higher in the heavy load operation than in the light load operation. By using this relationship, the pressure in the combustion chamber may be calculated on the basis of the related crank angle and the operating condition of the engine. For example, the in-cylinder pressure may be calculated on the basis of the map which gives the relationship between the related crank angle and the corresponding load on the engine. Since the change in the pressure can be calculated in the same procedure used in relation to FIG. 9 to calculate the pressure change in the fuel rail during the fuel injection period, the description of the calculation of the fuel pressure in the fuel rail during the fuel injection period will be omitted here.

Figure 17:
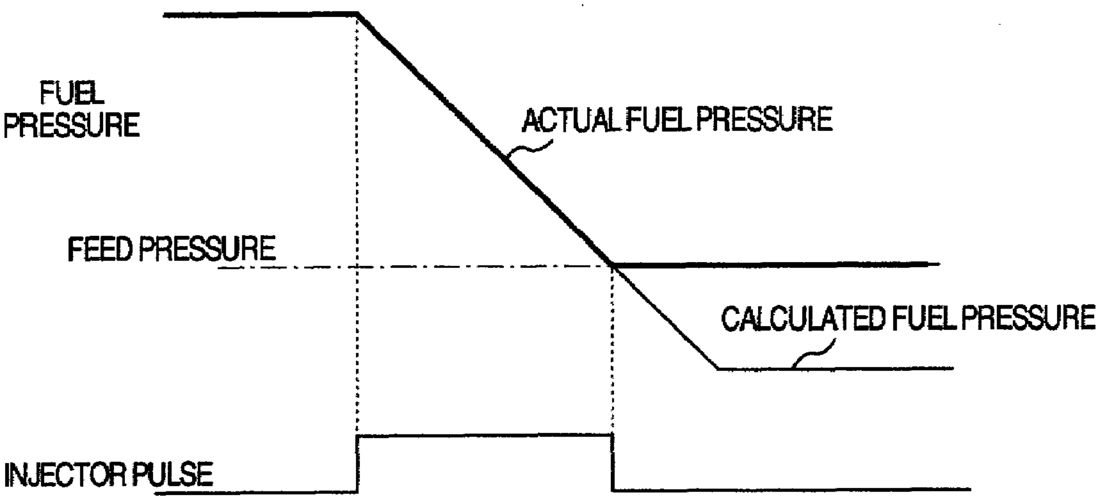
FIG. 17 graphically shows the change in the pressure of fuel in the fuel rail during fuel injection, observed in this invention.

FIG. 17 graphically shows the change in the pressure of fuel in the fuel rail during fuel injection, observed in this invention.

In FIG. 17, the change in the fuel pressure is shown in three stages: before, during, and after fuel injection, along with the fuel feed pressure. The injector pulse signal drives the injector open and close. As described above, the fuel pressure falls as the injector injection fuel. However, the actual fuel pressure during the fuel injection period does not fall down to zero, i.e. the atmospheric pressure, but is limited to a certain fixed value (i.e. feed pressure of 0.5 MPa in FIG. 17). This feed pressure is maintained through the combined operation of the pressure regulator and the in-tank fuel pump provided, besides the high-pressure fuel pump, in the fuel tank to feed fuel to the high-pressure fuel pump. Accordingly, the fuel pressure in the fuel rail falls at the lowest down to the feed pressure at the end of fuel injection. Therefore, this limitation must be considered in the calculation of the fuel pressure in the fuel rail during the fuel injection period, described in relation to FIGS. 12 and 13. If this limitation is not involved in the calculation, the calculated fuel pressure deviates from the actual fuel pressure as shown in FIG. 17. Consequently, the precision of fuel injection control near at the feed pressure becomes poor, that is, larger quantity of fuel than is necessary is injected out of the injector.

Figure 18:
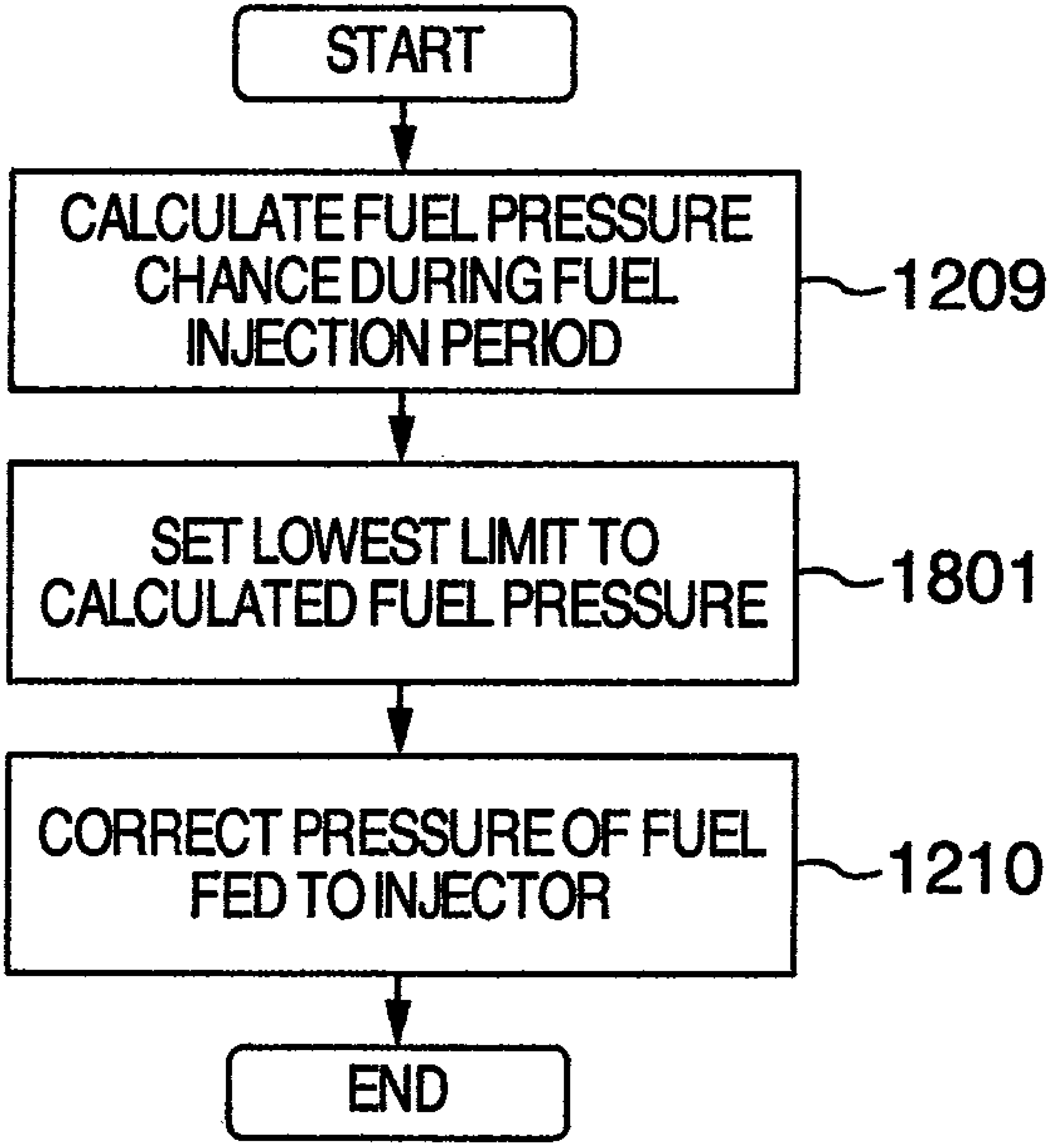
FIG. 18 is a flow chart for controlling the lower limit of fuel pressure in the fuel pressure correction according to this invention.

FIG. 18 is a flow chart for controlling the lower limit of fuel pressure in the fuel pressure correction according to this invention. The operations performed in the respective steps in FIG. 18 are executed by the CPU 26 shown in FIG. 1 according to the preloaded programs.

In step 1209, as shown in FIG. 12, the fuel pressure change during the fuel injection period is calculated. In step 1801, the fuel pressure calculated depending on the fuel pressure change is processed so that the lowest limit, i.e. feed pressure, may be set to the calculated fuel pressure as described in relation to FIG. 17. In step 1210, as shown in FIG. 12, the fuel pressure is first processed to be given the lowest limit and then the pressure of fuel fed to the injector is corrected depending on the fuel pressure calculated during the fuel injection period.

If the high-pressure fuel pump is deemed to be faulty, the correction of the fuel fed to the injector may be performed on the basis of the pressure value obtained by sampling the output of the pressure sensor at the time of starting fuel injection or at a constant interval. When the high-pressure fuel pump is deemed to be in full-discharge failure, the correction of the feed pressure may be performed on the assumption that the pump is continuing to discharge fuel in its maximum discharge capacity, irrespective of the actual position of the actuator for the pump. Or, when the pump is deemed to be in zero-discharge failure, the feed pressure correction may be performed on the assumption that the pump is not discharging fuel at all, irrespective of the actual position of the actuator for the pump.

If the fuel pressure sensor is deemed to be faulty, the feed pressure correction may be performed so that the discharge quantity from the high-pressure fuel pump may be maximum, i.e. of full discharge, or minimum, i.e. of zero discharge, while assuming that the output of the pressure sensor is of a fixed value, not any value obtained by it.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A control apparatus for an internal combustion engine having a high-pressure fuel pump discharging fuel into a fuel pipe, detection means for detecting fuel pressure in said fuel pipe and a fuel injector injecting fuel of said fuel pipe into a cylinder of said engine, wherein said control apparatus controls a quantity of fuel injected by said fuel injector based on a difference between a quantity of injected fuel from said fuel injector and a quantity of fuel discharged from said high-pressure pump in a time period of fuel injection of said fuel injector.

2. The control apparatus according to claim 1, wherein said control apparatus controls the quantity of fuel injected by said fuel injector based on said difference and a fuel pressure in the fuel pipe at the timing of starting fuel injection of the fuel injector.

3. A control apparatus for an internal combustion engine having a high-pressure fuel pump discharging fuel into a fuel pipe, detection means for detecting fuel pressure in said fuel pipe and a fuel injector injecting fuel of said fuel pipe into a cylinder of said engine, wherein said control apparatus calculates a quantity of fuel injected by said fuel injector based on a fuel pressure obtained by said detection means, and controls an actual quantity of fuel injected by said fuel injector and a quantity of fuel discharged from said high-pressure pump in a time period of fuel injection of said fuel injector.

4. The control apparatus according to claim 3, wherein when said detection means is abnormal or at fault, a value of the fuel pressure is set in a fixed value.

5. The control apparatus according to claim 3, wherein when the high-pressure fuel pump is abnormal or at fault, either the quantity of fuel discharged from the high-pressure fuel pump during the fuel injection period is calculated as a constant value, or the time of starting the fuel discharge from the high-pressure fuel pump is set at a fixed interval, and the constant value takes different constant values depending on whether the high-pressure fuel pump is of full-discharge failure of zero-discharge failure.

* * * * *